Oct. 30, 1956 — F. W. SEYBOLD — 2,768,537
AUTOMATIC TRANSMISSION
Filed June 9, 1953 — 3 Sheets-Sheet 1

INVENTOR.
Frederick W. Seybold

Oct. 30, 1956     F. W. SEYBOLD     2,768,537
AUTOMATIC TRANSMISSION
Filed June 9, 1953     3 Sheets-Sheet 2
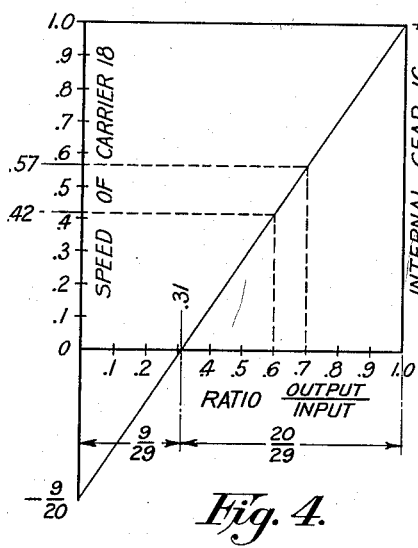
Fig. 4.
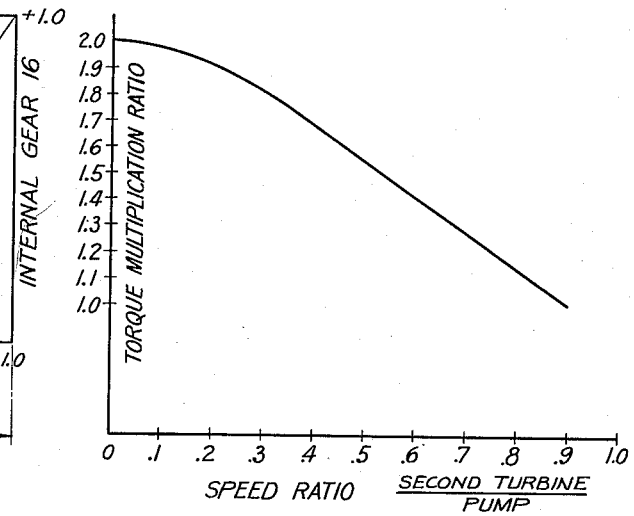
Fig. 5.
| SPEED RATIO OUTPUT/INPUT | SPEED RATIO SECOND TURBINE/PUMP | TORQUE MULTIPLICATION | TORQUE RATIOS - ENGINE TORQUE = 100 | | | | | | | NET REACTION | NET OUTPUT 24 | EFFICIENCY | FIGURE | ITEMS |
|---|---|---|---|---|---|---|---|---|---|---|---|---|---|---|
| | | | FIRST TURBINE 12 | SECOND TURBINE 13 | REACTION | | OUTPUT | | | | | | | |
| | | | | | SUN GEAR 21 | SUN GEAR 22 | CARRIER 25 | INTERNAL GEAR 28 | | | | | | |
| 0 | 0 | 2.0 | 200 | -100 | -133 | 0 | 333 | 0 | | -233 | 333 | 0 | 1-2 | 25 |
| .1 | .07 | 1.98 | 152 | -52 | -101.3 | 0 | 253.3 | 0 | | -153.3 | 253.3 | 25.3 | ↑ | 24 |
| .2 | .14 | 1.95 | 112 | -12 | -74.7 | 0 | 186.7 | 0 | | -86.7 | 186.7 | 37.3 | | 23 |
| .3 | .21 | 1.90 | 84 | 30.4 | -56 | 9.1 | 140 | 21.3 | | -61.3 | 161.3 | 48.4 | | 22 |
| .4 | .28 | 1.83 | 64 | 65 | -42.7 | 19.5 | 106.7 | 45.5 | | -52.2 | 152.2 | 60.8 | | 21 |
| .5 | .35 | 1.75 | 50 | 87.5 | -33.3 | 26.3 | 83.3 | 61.3 | | -44.6 | 144.6 | 72.3 | | 20 |
| .6 | .42 | 1.67 | 42.9 | 95.1 | -28.6 | 28.6 | 71.5 | 66.5 | | -38 | 138 | 82.8 | | 19 |
| .7 | .57 | 1.45 | 39.5 | 87.6 | 26.3 | | 65.8 | 61.3 | | -27.1 | 127.1 | 89 | | 18 |
| .8 | .71 | 1.27 | 36 | 80 | 24 | | 60 | 56 | | -16 | 116 | 92.8 | | 17 |
| .9 | .85 | 1.07 | 32.4 | 72 | 21.6 | | 54 | 50.4 | | -4.4 | 104.4 | 94 | | 16 |
| 1.0 | .98 | 1.0 | 31 | 69 | 20.7 | | 51.7 | 48.3 | | 0 | 100 | 98 | ↓ | 15 |
| 1.43 | .98 | 1.0 | 0 | 100 | - | 30 | - | 70 | | 30 | 70 | 98 | 2 | 14 |
| 1 | 2 | 3 | 4 | 5 | 6 | 7 | 8 | 9 | | 10 | 11 | 12 | 13 | - |
Fig. 6.
INVENTOR.
Frederick W. Seybold INVENTOR.
Frederick W. Seybold

United States Patent Office 2,768,537
Patented Oct. 30, 1956

2,768,537

AUTOMATIC TRANSMISSION

Frederick W. Seybold, Westfield, N. J.

Application June 9, 1953, Serial No. 360,519

8 Claims. (Cl. 74—677)

This invention relates to automatic transmissions, particularly adapted for use internal combustion engines and other applications requiring variable torque and speed ratios.

A primary object of the present invention is to provide an automatic variable torque and speed transmission which is inherently capable to pass from a relatively high torque multiplication ratio smoothly and without intermediate steps into the direct ratio drive without benefit of auxiliary control elements, such as friction clutches or brakes which are usually applied or released to advance the transmission from low gear into high gear.

Another object of this invention is to provide a torque and speed controlled transmission which can automatically adapt itself to the required torque ratio.

A still further object of the invention is to provide a transmission which combines the flexibility of a multiple turbine fluid torque converter with a novel arrangement of two interconnected planetary gear sets to achieve a relatively high initial torque multiplication for starting and which is capable to effect the transition into the direct ratio drive without the presence of feed-back torque, at which time the torque converter will operate as a highly efficient fluid coupling and the output shaft will attain a high mechanical efficiency.

A further object of the present invention is to provide means whereby the economy of an "overdrive" is available through the novel use of a brake on an element of one of the planetary gear sets.

Another object of this invention is to incorporate in the transmission simple means for securing an emergency low gear ratio, reversibility, rocking the vehicle in mud and snow, and a device to prevent its backward rolling when the transmission is conditioned for forward operation.

This invention includes other novel features of construction which make this transmission eminently practical and superior in operation. Minor changes and rearrangements will, of course, be obvious to those skilled in the art, and such minor changes that can be made in the embodiment of the invention are to be understood to come within the scope of the claims.

The objects stated above with their advantages will become apparent upon reference to the following description taken in connection with the accompanying drawings, in which:

Figure 4 is a graph showing the speed relationship between the two turbines and the output shaft;

Figure 5 is a graph showing the torque multiplication ratio for various speed relationships between the second turbine and the pump of the torque converter;

Figure 6 is a tabulation of the torques on the various components of the transmission in terms of the applied engine torque and the efficiency corresponding to the various speed ratios;

GENERAL ARRANGEMENT

Figure 1:
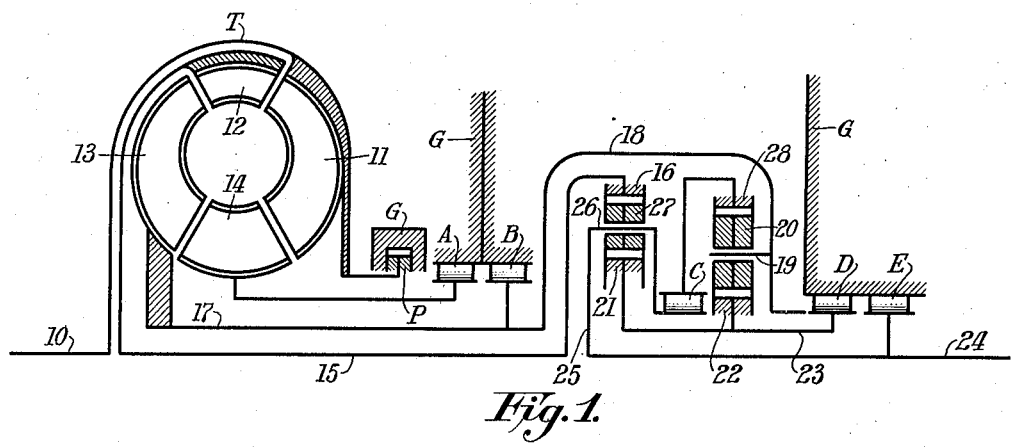
Figure 1 is a vertical, longitudinal section through a power transmission constructed according to my invention.

In general this invention comprises in its simplest form a four-element hydraulic torque converter, novel interconnected planetary gearing controlled by one-way clutches and brakes to impart a relatively high starting torque to the output shaft when the turbines of the torque converter are stalled, and as the turbines accelerate, the output shaft speed and torque approach that of the input shaft without benefit of a feed-back torque through the converter or the actuation of control elements to bring about a substantially direct ratio drive, at which time the converter will operate as a highly efficiency fluid coupling.

In a further refined form of this invention an overdrive ratio becomes available by the addition of a control element to one of reaction elements of the planetary gearing.

In a still further refined form of this invention an emergency low speed ratio is provided in the transmission by making one of the one-way brakes releasable; and by the provision of an auxiliary gear set, fluid pressure actuated clutches and a fluid pressure actuated pawl and brake arrangement for arresting the rotation of one of the turbines a reverse ratio drive is achieved.

The converter is composed of a pump driven by the prime mover and said pump discharges oil into a first turbine which is connected to one element of a first planetary gear set. The first turbine discharges the oil into the adjacent second turbine which is connected to an element of a second planetary gear set.

A stator or guide wheel serves as a reaction member of the converter and a one-way brake prevents reverse rotation of the stator, but allows its forward rotation when it is relieved of reverse torque.

A second element of said second planetary gear set cooperates through a one-way clutch with a second element of said first planetary gear set and the latter is also connected to the output member of the transmission.

The third members of said two planetary gear sets are connected and serve as the reaction members of the transmission and by means of one-way brakes are prevented from reverse rotation, while they accommodate forward rotation of said reaction members when reverse torque has vanished.

A one-way brake also cooperates with the second turbine and prevents its reverse rotation when the discharge of oil from the first turbine is so directed against the blades of the second turbine to induce reverse rotation of the latter element.

Finally, another one-way brake between the output member and the transmission casing prevents reverse rotation of the output member and this is a highly desirable feature when the vehicle is stopped on an incline and it is to be put into forward motion without initial backward rolling.

STRUCTURAL ARRANGEMENT

The transmission designed in accordance with the described general arrangement of this invention can best be understood by dividing the transmission into six assemblies for the purpose of describing it in detail.

The six assemblies are listed here as follows:

1. The driving assembly
2. The first turbine assembly
3. The second turbine assembly
4. The reaction assembly
5. The driven assembly
6. The no-roll-back assembly It is to be noted that the species of the invention illustrated in Figures 1 and 2 differ from each other only in the control and arrangement of the reaction members of the planetary gear sets. Therefore, identical members found in Figures 1 and 2 are designated by the same reference numerals, and the unique members of Figure 2 are designated by separate reference numerals.

Figure 2:
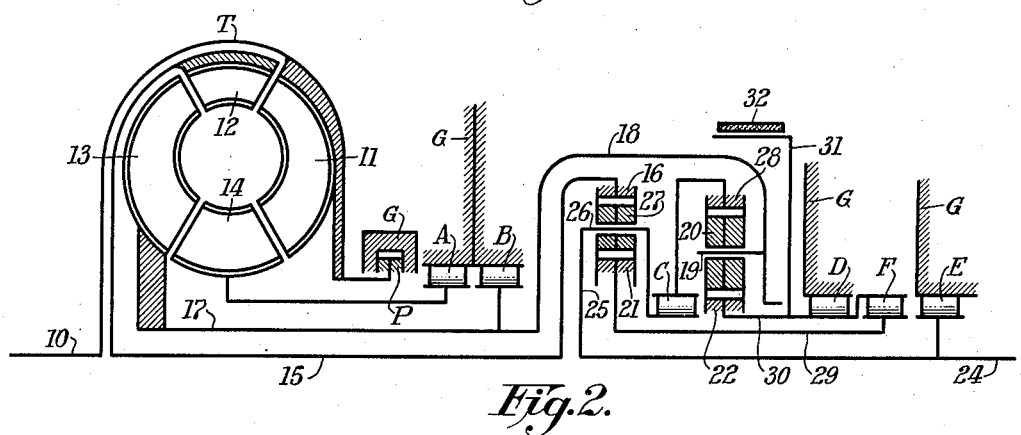
Figure 2 is a vertical, longitudinal section through a power transmission constructed similarly to that of Figure 1; but with additional means to provide an "overdrive" ratio.

One description will, therefore, serve for both Figure 1 and Figure 2 and the deviations will be clearly indicated at the appropriate place therein. A great deal of repetition of description will thereby be avoided.

Figure 3:
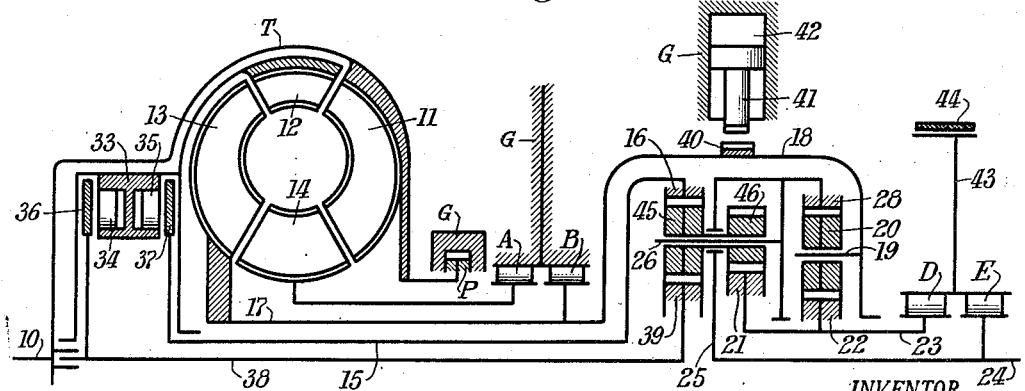
Figure 3 is a vertical, longitudinal section through a power transmission constructed similarly to those shown in Figures 1 and 2, but including additional means to procure reversibility and an emergency low drive.

In view of the considerable number of added elements to be found in Figure 3 it is deemed best to describe it separately and completely.

DESCRIPTION OF FIGURES 1 AND 2

1. *The driving assembly*

The driving assembly comprises the drive shaft 10 which is connected to the pump element 11 of the hydrokinetic torque converter T, which is composed of four elements. The pump 11 discharges oil into the first turbine element 12, the latter discharges the oil into the second turbine element 13, which in turn discharges the fluid into the stator 14.

An overrunning brake A prevents rotation of the stator 14 in a direction opposite to that of the drive shaft 10, while rotation in the same direction is accommodated by the brake A.

One gear of a gear pump P is also connected to and driven by the element 11 and this pump serves to supply pressure oil to the converter, as well as to other transmission control elements.

2. *The first turbine assembly*

The first turbine assembly is composed of the turbine element 12 which is connected to the long shaft 15, which in turn is connected to the internal gear 16.

3. *The second turbine assembly*

The second turbine assembly comprises the turbine element 13 and it is connected to the hollow shaft 17. The latter is fastened to the casing or carrier 18 to which several studs 19 are secured. Planetary pinions 20 are rotatably mounted on the studs 19. An overrunning brake B prevents reverse rotation of the second turbine element. The inner member of brake B is secured to the shaft 17, while the outer member of brake B is secured to the transmission casing G.

4. *The reaction assembly*

*Figure 1 only.*—The reaction assembly comprises the sun gear 21 integral with the sun gear 22. An overrunning brake D prevents reverse rotation of the sun gears 21 and 22. The inner member of brake D is secured to the hub extension 23 of the sun gears 21 and 22, while the outer member of brake D is secured to the transmission casing G.

*Figure 2 only.*—The reaction assembly comprises the sun gear 21 which is provided with a long hub 29 and the latter has the inner member of an overrunning clutch F connected thereto. The sun gear 22 of the second planetary gear set is also provided with a long, hollow hub 30 to which is secured the movable brake drum 31 as well as the inner member of the overrunning brake D and the outer member of the overrunning clutch F. The outer member of the brake D is secured to the transmission casing G.

Brake D prevents reverse rotation but accommodates forward rotation of pinion 22 and indirectly through clutch F it also prevents reverse rotation of pinion 21. Conversely, pinion 22 is capable to transmit forward torque to pinion 21 through the clutch F.

A stationary brake band 32 may be applied to brake drum 31 to arrest the forward rotation of pinion 22 to provide an overdrive ratio.

5. *The driven assembly*

The driven assembly comprises the output shaft 24 which is connected to the carrier 25 in which short shafts 26 are secured. Planetary pinions 27 are rotatably mounted on the shafts 26 and the pinions 27 mesh with the internal gear 16 and the sun gear 21.

An internal gear 28 which meshes with the planetary pinions 20 is connected to the outer member of an overrunning clutch C, whose inner member is secured to the carrier 25. Clutch C is so arranged that the internal gear 28 can transmit torque to the carrier 25 when gear 28 is rotating in the same direction as the drive shaft 10. Conversely, carrier 25 can overrun the internal gear 28 in the forward direction.

6. *The no-roll-back assembly*

The no-roll-back assembly comprises the overrunning brake E, whose inner member is secured to the driven shaft 24 and whose outer member is fastened to the transmission casing G. Brake E is so arranged that the output shaft 24 can rotate in the forward direction, but its reverse rotation is prevented by the brake E.

This device is a great convenience to the driver of the vehicle in which a transmission such as described above is installed when restarting the vehicle on an incline, as the dexterous manipulation of the foot brake and accelerator is thereby obviated.

DESCRIPTION OF FIGURE 3

1. *The driving assembly*

The description of the driving assembly for Figures 1 and 2 also applies to the design shown in Figure 3.

2. *The first turbine assembly*

The first turbine assembly comprises the turbine element 12 which is provided with a duplex cylinder 33 in which ring pistons 34 and 35 are installed for the actuation or selective coupling of the clutch plates 36 and 37 to the first turbine element 12.

Clutch plate 36 is mounted on one end of the long shaft 38, on the other end of which is secured the sun pinion 39. Clutch plate 37 is mounted on the long, hollow shaft 15, to the other end of which is fastened the internal gear 16.

3. *The second turbine assembly*

The second turbine assembly comprises the turbine element 13 which is connected to the hollow shaft 17. The latter is secured to the casing or carrier 18 in which several studs 19 are supported. An overrunning brake B prevents reverse rotation of the second turbine element. The inner member of brake B is secured to the shaft 17, while the outer member of brake B is fastened to the transmission casing G.

An externally toothed gear 40 is secured to the casing 18. A hydraulic pressure actuated pawl 41 is reciprocatably mounted in a cylinder 42 provided for in the transmission casing G. When the pawl 41 is engaged with the teeth of gear 40 the rotation of casing 18 in either direction is prevented.

4. *The reaction assembly*

The reaction assembly consists of the sun gear 21 integral with the sun gear 22 of the second planetary gear set. The inner member of an overrunning brake D is secured to the hub 23 of the pinions 21—22, while the outer member is fastened to the movable brake drum 43. A stationary brake band 44 may be applied to the brake drum 43 and when so applied prevents reverse rotation of pinions 21—22, while the brake D accommodates their forward rotation without releasing the brake band 44.

5. *The driven assembly*

The driven assembly comprises the output shaft 24 which is connected to the carrier 25 in which the short shafts 26 are secured and on them the compound planetary pinions 45 and 46 are journalled. An internal gear 28 is attached to the carrier 25 and gear 28 meshes with the planetary pinions 20 of the second turbine assembly.

The planetary pinions 45 mesh with the internal gear 16 and the sun pinion 39, while the planetary pinions 46 mesh with the reaction sun gear 21.

6. *The no-roll-back assembly*

In this design the inner member of the overrunning brake E is secured to the output shaft 24 and the outer member thereof is fastened in the hub of the brake drum 43, and as long as the brake band 44 is applied to the brake drum 43 reverse rotation of the output shaft 24 will be prevented while its forward rotation remains feasible.

OPERATION—FIGURES 1 AND 2

A. *Idling or "neutral" operation*

In view of the fact that the arrangement of the planetary gearing shown in Figures 1 and 2 does not provide for a "reverse" ratio drive a standard gear box which includes a "forward," "neutral" and "reverse" position would ordinarily be connected to the output shaft 24.

In addition, a control lever (not shown), applied to the steering post of the vehicle, having a series of positions is also used in conjunction with the transmission of this invention, but it is not a subject thereof.

For the purpose of illustrating the design of a transmission of this invention the following gear proportions have been selected:

First gear set—

|  | Teeth |
|---|---|
| Sun gear 21 | 48 |
| Planet pinions 27 | 12 |
| Internal gear 16 | 72 |

Second gear set—

|  | Teeth |
|---|---|
| Internal gear 28 | 63 |
| Sun gear 22 | 27 |
| Planet pinions 20 | 18 |

B. *Forward drive operation*

With the foot brake applied the standard transmission control lever is shifted into the forward drive gear connection of the standard gear box. As the engine is then still idling both turbines and their connected planetary gearing cease to rotate. Upon release of the foot brake and an acceleration of the engine the converter pump torque will rise and the velocity of oil flow will have correspondingly increased.

The oil thrust by the pump 11 against the curved vanes of the stalled first turbine 12 upon leaving them reacts against the stalled curved vanes of the second turbine 13 and thereby augments the torque of the first turbine 12. In other words, the second turbine now serves as a reaction or stator member for the first turbine 12 when the latter commences to rotate. Roller brake B at this stage of operation prevents backward rotation of the second turbine 13.

At stall of both turbines with a pump torque of 100 units, a torque of 200 units will be imparted to the first turbine 12 and a negative reaction torque of 100 units will be felt by the second turbine 13. As the first turbine begins to rotate and drives internal gear 16 a torque of 333 units will be delivered to planetary pinion carrier 25 and ouput shaft 24, due to the reaction sun gear 21, which is held from backward rotation by roller brake D.

As the first turbine speed increases the oil enters the blades of the second turbine 13 at a more favorable angle, thereby decreasing the reaction torque of the second turbine and correspondingly reducing the total driving torque of the first turbine 12.

As long as a negative torque is felt by the second turbine 13 it will remain stationary and, therefore, the entire second planetary gear set also remains stationary. The function of roller clutch C is to permit the second turbine 13 to remain stationary and serve as a reaction member for the first turbine 12, thereby increasing its torque as well as the output shaft torque. If the internal gear 28 were connected directly to carrier 25 then 70% of the negative torque felt by the second turbine would have to be deducted from the torque of carrier 25 which it receives from the first turbine and the sun gear 21.

Figure 7:
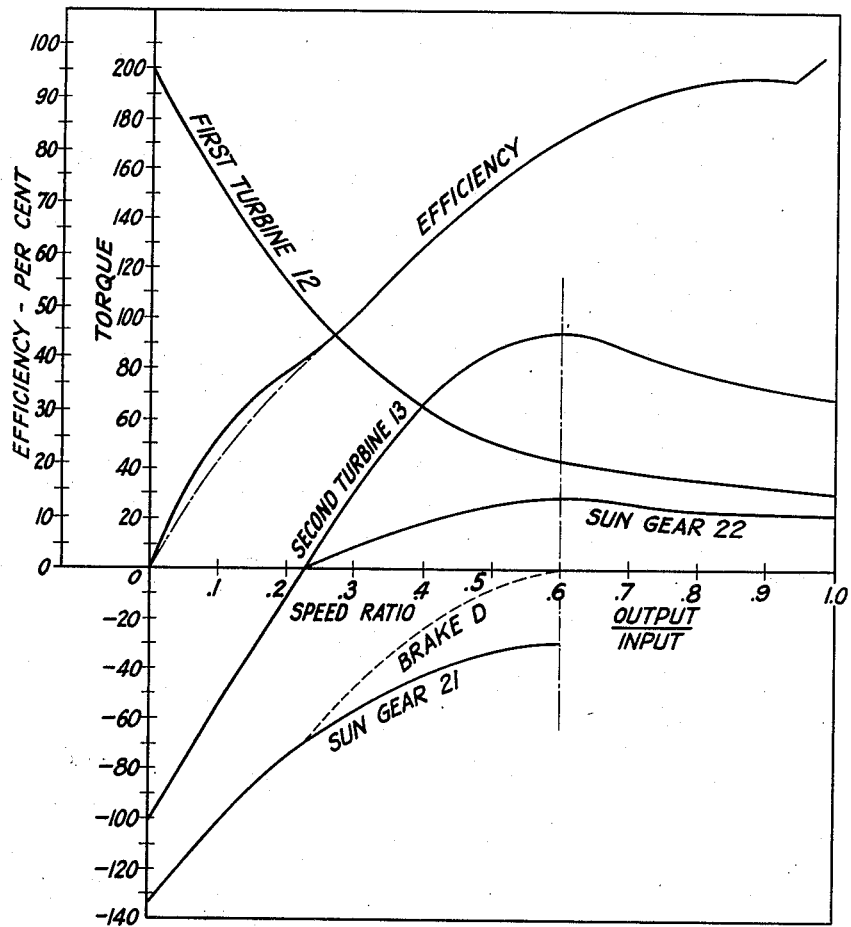
Figure 7 is a graph depicting the values tabulated in Figure 6.

Hence the efficiency of the transmission would be lessened, and the efficiency curve would then be according to the dot-dash line indicated in Figure 7.

As the speed of the first turbine 12 as well as that of the output shaft increases the negative torque felt by the second turbine diminishes to zero, and thereafter the oil inpinging on the blades of the second turbine imparts a positive torque thereto and it will then begin to rotate in the forward direction.

Also at this phase of the operation the fluid velocity in the converter has decreased and less torque will be transmitted by the first turbine, while the second turbine which is compelled to rotate at a fixed ratio relative to the first turbine determined by the gear proportions of the interconnected planetary gear sets continues to deliver multiplied torque to carrier 18 as long as the stator 14 remains stationary.

According to the gear data given above when the speed of the second turbine 13 exceeds a value of .42 in terms of unity value for the speed of the first turbine or a value of .60 for the speed of the output shaft 24 the net reaction torque on sun gears 21 and 22 must then be zero, see items 6 and 7 on line 19 of Figure 6.

For this condition to be possible the torque distribution on the components of the two interconnected planetary gear sets must be as follows, if the torque on the sun gear 22 is equal to T.

First gear set:

| | |
|---|---|
| Internal gear 16 | 1.5 T |
| Planet pinions 27 | 2.5 T |
| Sun gear 21 | − T |

Second gear set:

| | |
|---|---|
| Internal gear 28 | 7/3 T |
| Planet pinions 20 | 10/3 T |
| Sun gear 22 | T |

By referring to Figure 5 the torque multiplication ratio for the second turbine is 1.67 for a speed ratio of $$\frac{\text{Second turbine}}{\text{Pump}} = .42$$

The pump torque of 100 units is distributed to the two turbines as follows:

| | |
|---|---|
| First turbine torque | 1.5 T |
| Second turbine torque | 10/3 × 1/1.67 = 2 T |
| Pump torque | 100 units = 3.5 T |

Therefore, T = 100/3.5 = 28.6 units

The torque distribution in terms of 100 units of pump torque on the components of the interconnected planetary gear sets is then:

First gear set—

| | |
|---|---|
| Internal gear 16 | 42.9 |
| Planet pinions 27 | 71.5 |
| Sun gear 21 | −28.6 |

Second gear set—

| | Teeth |
|---|---|
| Internal gear 28 | 66.5 |
| Planet pinions 20 | 95.1 |
| Sun gear 22 | 28.6 |

The net output shaft torque is then 71.5+66.5=138 units and the output shaft 24 rotates 6/10 as fast as the first turbine the transmission efficiency is then 138×.60=82.8%.

The second turbine torque is 95.1 units derived from 100—42.9=57.1 units times a torque multiplication factor of 1.67 (see Fig. 5) due to stator 14, or conversely 57.1 units of pump torque have been augmented by 38 units of stator reaction torque to produce 95.1 units of torque on the second turbine.

As the speed of the second turbine 13 continues to increase and exceeds a value of .42 times the speed of the first turbine 12 the forward torque of the sun gear 22 will be transmitted to sun gear 21, because sun gear 22 in Figure 1 is integral with sun gear 21, and in Figure 2 sun gear 22 transmits torque to sun gear 21 through roller clutch F. Therefore, sun gear 21 serves as a first input member to carrier 25, while the first turbine 12 and internal gear 16 serve as the second input member to carrier 25.

The torque of the second turbine is divided between the internal gear 28 and the sun gear 22 previously mentioned, both torques being in the forward direction. The torque received by the internal gear 28 is transmitted through roller clutch C to the carrier 25 and this torque added to the torque received by the carrier 25 from the internal gear 16 and sun gear 21 is passed on to the output shaft 24.

It is to be observed that there is no "feed-back" torque through the converter in order to bring about the condition when the reaction sun gears 21 and 22 begin their forward rotation. This unusual condition is due to the fact that only one turbine delivers torque to one planetary gear set, i. e. the first turbine 12 delivers torque to only the first gear set, while the second turbine 13 delivers torque to only the second gear set.

Finally, the speed of the second turbine will approach that of the first turbine and pump. The portion of the pump torque absorbed by the first turbine has been further reduced, and in approximately direct drive, only 31% of the pump torque is taken up by the first turbine, while 69% is taken up by the second turbine.

Assuming that in direct drive the second turbine speed is 3% less than the pump speed, then the output shaft speed will be 97.33% of the speed of the input shaft 10 for the gear data indicated above.

C. *"Overdrive" operation*

To operate the transmission in "overdrive" a suitable control member, such as a governor (not shown) or manual means, applies the brake band 32 to the brake drum 31 of Figure 2. The sun gear 22 will thereby be halted and the planetary pinions 20 on carrier 18 will cause internal gear 28 to rotate 1.43 times faster than carrier 18. Overrunning clutch C will drive carrier 25 and output shaft 24. The first turbine 12 will, of course, rotate freely in the fluid circuit of the torque converter and as the carrier 25 rotates 1.43 times faster than the first and second turbines the sun gear 21 will be compelled to rotate 2.075 times as fast in the forward direction as the turbines, this being accommodated by the overrunning clutch F.

The entire engine torque of 100 units is taken up by the second turbine 13, transmitting 70 units of torque to internal gear 28, i. e. carrier 25 and output shaft 24, and 30 units of forward torque to sun gear 22, the latter torque being absorbed by the brake band 32, see line 14 of Figure 6.

This invention, therefore, provides a transmission comprising a multiple rotor torque converter coupled to two interconnected planetary gear sets which is capable of passing from the high torque ratio through continously decreasing torque ratios into the direct drive ratio without the intervention of external controls.

This automatic attainment is the resulting combination of a suitable blading arrangement of the impeller, turbines and stator, and the novel planetary gear train in which a torque balance occurs after a fixed speed ratio between the turbine has been reached.

OPERATION—FIGURE 3

A. *Emergency low operation*

To operate this transmission in emergency low, the control lever is shifted into the position whereby rotation of carrier 18 is prevented by the engagement of the hydraulic pressure actuated pawl 41 with the teeth 40 on the carrier 18. At the same time clutch plate 37 will be locked to the first turbine element 12, while the brake band 44 will be released from the brake drum 43.

With the acceleration of the engine the first turbine 12 will be driven by the high velocity oil flow and its torque will be augmented by the now stationary second turbine 13 serving as a reaction member. The combined sun gears 21 and 22 now rotate in a reverse direction.

For the purpose of illustrating the design of Figure 3 the following gear proportions have been selected:

| First gear set— | Teeth |
|---|---|
| Sun gear 39 | 42 |
| Planet pinions 45 | 15 |
| Internal gear 16 | 72 |
| Planet pinions 46 | 12 |
| Sun gear 21 | 45 |
| Second gear set— | |
| Sun gear 22 | 27 |
| Planet pinions 20 | 18 |
| Internal gear 28 | 63 |

For one revolution of the internal gear 16 the output shaft 24 will make .277 revolution, equal to a torque ratio of 3.6:1, which will be doubled approximately by the torque converter when the first turbine 12 is stalled.

B. *Forward drive operation*

Shifting the control lever into the "drive" position will bring about a release of pawl 41 from the teeth 40 of carrier 18 and the application of brake band 44 to the brake drum 43. Clutch plate 37, remaining locked to the first turbine element 12, will drive the output shaft 24 at a speed of .56 revolution for one revolution of the turbine 12, equal to a ratio of 1.78:1, which will be doubled approximately by the torque converter, but the backward torque on internal gear 28 impressed thereon by the reaction torque of the second turbine element 13 will reduce the torque developed in the first planetary gear set.

For an engine torque of 100 units, therefore, the torque developed in the first planetary gear set for 200 units of torque on the first turbine 12 when stalled is then 1.78×200 or 356 units of torque. The reverse torque on the second turbine being 100 units will impress 70 units of reverse torque on internal gear 28, therefore, resulting in a net forward torque of 356—70 or 286 units.

The absence of overrunning clutch C, therefore, reduces the output torque. However, if reversibility is to be had with this gear arrangement clutch C must be dispensed with.

The transition from the high torque ratio through continuously decreasing torque ratios and finally into the direct drive ratio will take place in the same manner as previously described for the operation of the transmissions shown in Figures 1 and 2.

The torque distribution in terms of 100 units of pump torque on the components of the interconnected planetary gear sets, in accordance with the stated gear data and when the speed ratio of the second turbine to the first turbine exceeds .393, is then:

First gear set—
    Internal gear 16_____ 27.8
    Compound planet pinions 45—46_____ 49.5
    Sun gear 21_____ —21.6
Second gear set—
    Internal gear 28_____ 50.5
    Planet pinions 20_____ 72.2
    Sun gear 22_____ 21.6

C. Reverse operation

Shifting the control lever into the "reverse" position will engage pawl 41 with the teeth 40 on carrier 18, stalling the second turbine element 13. Brake band 44 will also be released from the brake drum 43, clutch plate 37 will also be released from the first turbine element 12, but clutch plate 36 will be locked thereto and drives sun gear 39.

The output shaft 24 will then make .288 reverse revolution for one forward revolution of the sun gear 39, equal to a torque ratio of 3.46:1, which will be doubled approximately by the torque converter, when the first turbine is stalled.

Shifting the control lever into the "emergency" low position will release clutch plate 36 and engage clutch plate 37, pawl 41 remaining in engagement with the teeth 40 on carrier 18 and brake band 44 also remaining disengaged from the brake drum 43.

The vehicle in which a transmission such as just described is installed can be "rocked" in snow or mud by the mere shifting of the control lever from the "emergency" low position into the "reverse" position.

A rapid reversal of motion of the vehicle is thereby produced by the alternate engagement and disengagement of the clutch plates 36 and 37, and pawl 41 being in engagement with the teeth 40 on carrier 18, and remaining therewith when the transmission is conditioned for "emergency low" as well as for "reverse" operation, all other control elements being in their inoperative condition for this "rocking" operation.

Similarly, when down-hill braking of the vehicle is required the "emergency" low ratio drive is available therefor.

Three forms of the invention have now been described in detail and obvious modifications, rearrangements or minor improvements can be made by those skilled in the art. It should be further understood that the gear proportions illustrated in the specification may be altered greatly to accommodate various operating conditions and applications, and such modifications and changes shall come within the scope of the following claims.

I claim:

1. A variable speed power transmission comprising in combination, a drive shaft, a driven shaft, a hydraulic torque converter composed of multiple turbines, pump and stator elements, said turbines being interconnected with first and second planetary gear sets, each having an internal gear, a sun gear, and a planet pinion carrier whose pinions mesh with said internal and sun gears, the pump element of said converter being connected to the drive shaft, the internal gear of the first planetary gear set being connected to the first turbine elements, the planet carrier of the second planetary gear set being connected to the second turbine element, brake means on said carrier, the stator of said converter being positioned between said second turbine and said pump, the planet carrier of the first planetary gear set being connected to the driven shaft, the internal gear of said second gear set having a connection with the carrier of said first gear set, the sun gears of both gear sets being joined and having brake means thereon, whereby an initial high torque ratio drive is generated in said first turbine and said first gear set, and thereafter a continuously decreasing torque is delivered by said first turbine and a continuously increasing torque is generated by said second turbine and said second gear set, said combined torques being delivered to said driven shaft.

2. A variable speed power transmission comprising in combination, a drive shaft, a driven shaft, hydraulic torque converter composed of multiple turbines, pump and stator elements, said turbines being interconnected with first and second planetary gear sets, each having an internal gear, a sun gear, and a planet pinion carrier whose pinions mesh with said internal and sun gears, the pump element of said converter being connected to the drive shaft, the internal gear of the first planetary gear set being connected to the first turbine element, the planet carrier of the second planetary gear set being connected to the second turbine element, overrunning brake means on said carrier, the stator of said converter being positioned between said second turbine and said pump and having overrunning brake means thereon, the planet carrier of the first planetary gear set being connected to the driven shaft, the internal gear of said second gear set having an overrunning clutch connection with the carrier of said first gear set, the sun gears of both gear sets being joined and having overrunning brake means thereon, whereby initial driving effort is delivered to said driven shaft by the first turbine and by the first planetary gear set only, and to be followed by a decrease of driving effort therefrom but augmented by an initial driving effort from said second turbine and said second gear set, and finally a balance of torques in the turbines, stator and planetary gearing is brought about to effect a direct ratio drive between the drive shaft and the driven shaft.

3. A variable speed power transmission comprising in combination, a drive shaft, a driven shaft, overrunning brake means thereon, a hydraulic torque converter composed of multiple turbines, pump and stator elements, said turbines being interconnected with first and second planetary gear sets, each having an internal gear, a sun gear, and a planet pinion carrier whose pinions mesh with said internal and sun gears, the pump element of said converter being connected to the drive shaft, the internal gear of the first planetary gear set being connected to the first turbine elements, the planet carrier of the second planetary gear set being connected to the second turbine elements, overrunning brake means on said carrier, the stator of said converter being positioned between said second turbine and said pump and having overrunning brake means thereon, the planet carrier of the first planetary gear set being connected to the driven shaft, the internal gear of said second gear set having an overrunning clutch connection with the carrier of said first gear set, the sun gears of both gear sets being joined and having overrunning brake means thereon, whereby initial driving effort is delivered to said driven shaft by the first turbine and by the first planetary gear set only, and to be followed by a decrease of driving effort therefrom but augmented by an initial driving effort from said second turbine and said second gear set, and finally a balance of torques in the turbines, stator and planetary gearing is brought about to effect a direct ratio drive between the drive shaft and the driven shaft.

4. A continuously variable speed and torque power transmission comprising in combination, a drive shaft, a driven shaft, hydraulic torque converter composed of multiple turbines, pump and stator elements, said turbines being interconnected with first and second planetary gear sets, each having an internal gear, a sun gear and a planet carrier whose pinions mesh with said internal and sun gears, the internal gear of the first gear set being connected to the first turbine element of said converter, the pump thereof being connected to the drive shaft, the planet carrier of the second gear set being connected to the second turbine element, overrunning brake means on said planet carrier, the stator of said converter being positioned between said second turbine and said pump and having overrunning brake means thereon, the planet carrier of the first gear set being connected to the driven shaft, the internal gear of said second gear set having an overrunning clutch drive connection with the planet carrier of said first gear set, the sun gear of the first gear set having an overrunning clutch drive connection with the sun gear of the second gear set, and overrunning brake means on said last named sun gear, whereby the initial driving phase is effected by the first turbine and the first planetary gear set only, the second driving phase is effected by both turbines and both planetary gear sets, and a third phase is effected by a torque balance in the converter and in the planetary gearing finally resulting in a direct ratio drive between the drive shaft and the driven shaft.

5. A continuously variable speed and torque power transmission comprising, in combination, a drive shaft, a driven shaft, overrunning brake means thereon, a hydraulic torque converter composed of multiple turbines, pump and stator elements, said turbines being interconnected with first and second planetary gear sets, each having an internal gear, a sun gear and a planet carrier whose pinions mesh with said internal gear and said sun gear, the internal gear of the first gear set being connected to the first turbine element of said converter, the pump thereof being connected to the drive shaft, the planet carrier of the second gear set being connected to the second turbine element, overrunning brake means on said planet carrier, the stator of said converter being positioned between said second turbine and said pump and having overrunning brake means thereon, the planet carrier of the first gear set being connected to the driven shaft, the internal gear of said second gear set having an overrunning clutch drive connection with the planet carrier of said first gear set, the sun gear of the first gear set having an overrunning clutch drive connection with the sun gear of the second gear set, and overrunning brake means on said last named sun gear, whereby the initial driving phase is effected by the first turbine and the first planetary gear set only, the second driving phase is effected by both turbines and both planetary gear sets, and a third phase is effected by a torque balance in the converter and in the planetary gearing finally resulting in a direct ratio drive between the drive shaft and the driven shaft.

6. A continuously variable speed and torque power transmission comprising in combination, a drive shaft, a driven shaft, a hydraulic torque converter composed of multiple turbines, pump and stator elements, said turbines being interconnected with first and second planetary gear sets, each having an internal gear, a sun gear and a planet carrier whose pinions mesh with said internal gear and said sun gear, the internal gear of the first gear set being connected to the first turbine element of said converter, the pump thereof being connected to the drive shaft, the planet carrier of the second gear set being connected to the second turbine element, overrunning brake means on said planet carrier, the stator of said converter being positioned between said second turbine and said pump and having overrunning brake means thereon, the planet carrier of the first gear set being connected to the driven shaft, the internal gear of said second gear set having overrunning clutch drive means to transmit forward torque to the planet carrier of said first gear set, the sun gear of the first gear set having an over running clutch drive means to transmit reverse torque to the sun gear of the second gear set, overrunning brake means and movable brake means on said last named sun gear, stationary brake means cooperating with said movable brake means, whereby the initial driving phase is effected by the first turbine and the first planetary gear set only, the second driving phase is effected by both turbines and both planetary gear sets, the third driving phase is effected by a torque balance in the converter and in the planetary gearing finally resulting in a direct ratio drive between the drive shaft and the driven shaft, and a fourth phase is effected by applying said stationary brake means to said movable brake means, resulting in an over-drive ratio between the drive shaft and the driven shaft.

7. A compound torque multiplying mechanism for transmitting uninterrupted torque comprising in combination, a transmission casing, co-axial drive and driven shafts, two interconnected planetary gear sets, each having three elements, a hydro-dynamic torque device composed of multiple turbines, pump and stator elements and having a first turbine thereof operatively connected to a first element of a first gear set and a second turbine thereof connected to a first element of the second gear set, said second turbine having one-way brake means in cooperating relation with said transmission casing, the pump of said hydro-dynamic device being connected to said drive shaft, the stator of said hydro-dynamic device being positioned between said second turbine and said pump and having one-way brake means thereon in cooperating relation with said transmission casing, a second element of each gear set being operatively interconnected and serving as the reaction member and having one-way brake means thereon in cooperating relation with said transmission casing, the third element of each gear set being operatively connected to said driven shaft and one of said second elements having additional brake means, whereby an overdrive ratio is provided when said additional brake means is engaged.

8. A compound torque multiplying mechanism for transmitting uninterrupted torque comprising in combination, a transmission casing, coaxial drive and driven shafts, a hydro-dynamic torque converter composed of multiple turbines, pump and stator elements, said turbines being interconnected with two interconnected planetary gear sets, each having input, output and reaction elements, a first turbine of said converter being operatively connected to the input element of a first gear set and a second turbine of said converter being connected to the input element of the second gear set, said second turbine having one-way brake means in cooperating relation with said transmission casing, the pump of said converter being connected to said drive shaft, the stator of said converter being positioned between said second turbine and said pump and having one-way brake means thereon in cooperating relation with said transmission casing, the reaction element of the first gear set being operatively connected to the reaction element of the second gear set and in cooperating relation with brake means on said transmission casing, and the output elements of both gear sets being operatively connected to said driven shaft, said arrangement effecting in a first phase a high torque on said driven shaft, in a second phase a gradually decreasing torque with an increase of speed on said driven shaft, and attaining in a third and final phase a torque balance in the converter and planetary gearing, thereby resulting in a direct drive ratio between said drive and driven shafts.

References Cited in the file of this patent

UNITED STATES PATENTS

| | | |
|---|---|---|
| 1,496,740 | Raven | June 3, 1924 |
| 2,297,259 | Speiser | Sept. 29, 1942 |
| 2,312,849 | Pollard | Mar. 2, 1943 |
| 2,325,876 | Pollard | Aug. 3, 1943 |
| 2,602,353 | Keller | July 8, 1952 |
| 2,616,309 | Russell | Nov. 4, 1952 |
| 2,645,137 | Roche | July 14, 1953 |
| 2,658,346 | Seybold | Nov. 10, 1953 |

FOREIGN PATENTS

| | | |
|---|---|---|
| 666,092 | Great Britain | Feb. 6, 1952 |